United States Patent [19]
Cocchi et al.

[11] Patent Number: 6,158,331
[45] Date of Patent: Dec. 12, 2000

[54] FEED DEVICE FOR PASTY OR LIQUID FOOD MIXTURES

[75] Inventors: Gino Cocchi; Giancarlo Pietra, both of Bologna, Italy

[73] Assignee: Ali S.p.A., Italy

[21] Appl. No.: 08/916,324

[22] Filed: Aug. 22, 1997

[30] Foreign Application Priority Data

Feb. 26, 1997 [IT] Italy .................................. GE9700019

[51] Int. Cl.⁷ .............................. A23L 1/00; A23G 1/00; A23G 9/00
[52] U.S. Cl. ................................ 99/471; 62/343; 99/452; 99/467; 99/517; 366/144; 366/149
[58] Field of Search ........................... 99/452–455, 517, 99/516, 467, 471, 473, 476, 483; 62/342, 343, 197; 141/89–91, 104, 174; 220/403, 451, 465, 331, 335, 257, 592.02, 521, 592.03; 222/63, 146.1, 146.6, 509, 559, 406; 366/144, 149, 310, 279, 102, 138; 426/94, 297

[56] References Cited

U.S. PATENT DOCUMENTS

| | | | |
|---|---|---|---|
| 3,989,492 | 11/1976 | Keyes | 62/342 |
| 4,165,620 | 8/1979 | Gehauf Nee Kiesel et al. | 99/476 X |
| 4,463,572 | 8/1984 | Brown, Jr. | 366/144 X |
| 4,674,886 | 6/1987 | Uesaka et al. | 366/144 |
| 4,817,396 | 4/1989 | Menzel | 62/342 X |
| 4,867,052 | 9/1989 | Cipelletti | 99/455 X |
| 4,951,559 | 8/1990 | Arao et al. | . |
| 4,993,238 | 2/1991 | Inagaki | 366/102 X |
| 5,199,278 | 4/1993 | Cocchi | 62/343 |
| 5,312,184 | 5/1994 | Cocchi | 366/310 X |
| 5,382,090 | 1/1995 | Cocchi | 366/144 X |
| 5,387,735 | 2/1995 | Ponsi et al. | . |
| 5,603,229 | 2/1997 | Cocchi et al. | 62/343 |

FOREIGN PATENT DOCUMENTS

| | | |
|---|---|---|
| 0495211 | 7/1992 | European Pat. Off. . |
| 0567665 | 11/1993 | European Pat. Off. . |
| 0708036 | 4/1996 | European Pat. Off. . |
| 2558688 | 8/1985 | France . |

*Primary Examiner*—Timothy F. Simone
*Attorney, Agent, or Firm*—Larson & Taylor, PLC

[57] ABSTRACT

Feed Machine, preferably for use in machines for processing ice-cream mixtures or the like, having an element that swings (202; 203; 204; 205; 206) about a given axis between two positions and works in conjunction with a suitable housing (102; 103; 104; 105; 106) located at an opening made in one wall (1) of the machine (10). One of the two positions of the swing element (202; 203; 204; 205; 206) allows communication between the processing chamber and the outside environment and the other position prevents such communication. The housing (102; 103; 104; 105; 106) presents on its surface a funnel-shaped cavity (112; 113; 114; 115; 116) open at the bottom.

18 Claims, 12 Drawing Sheets

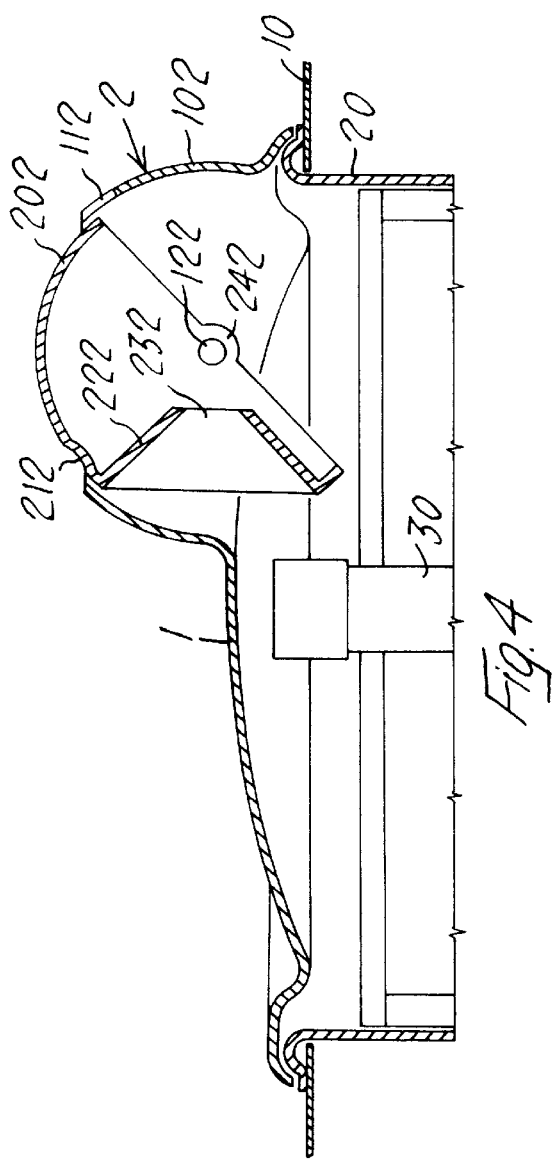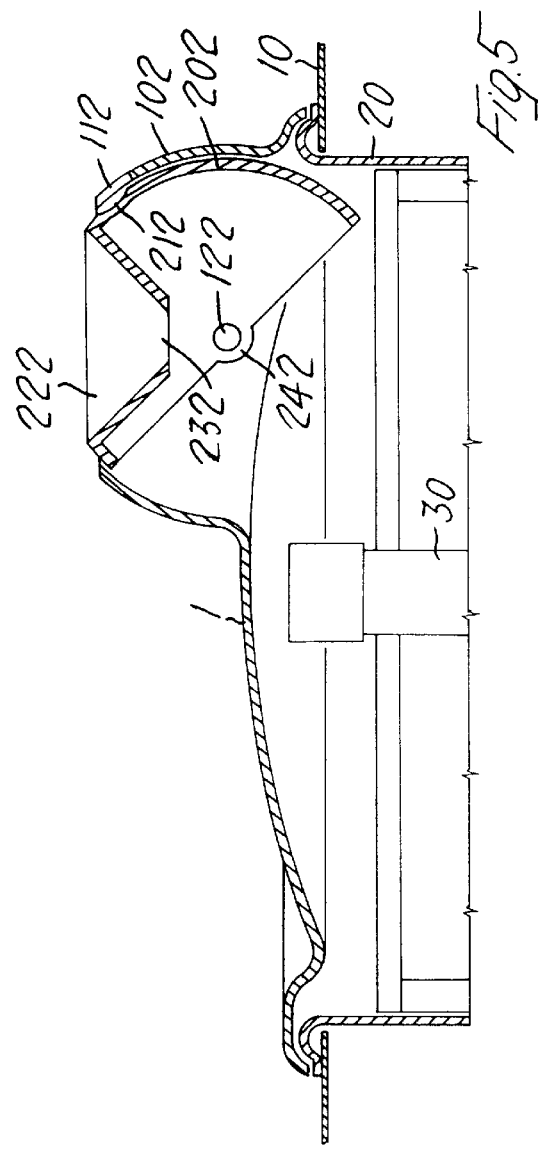

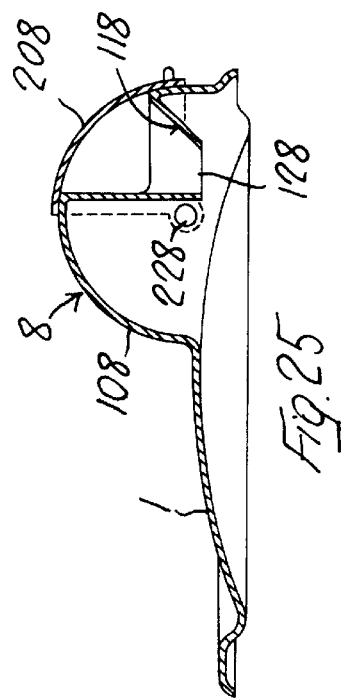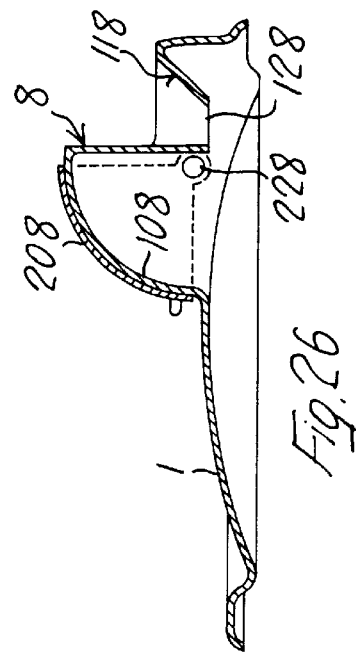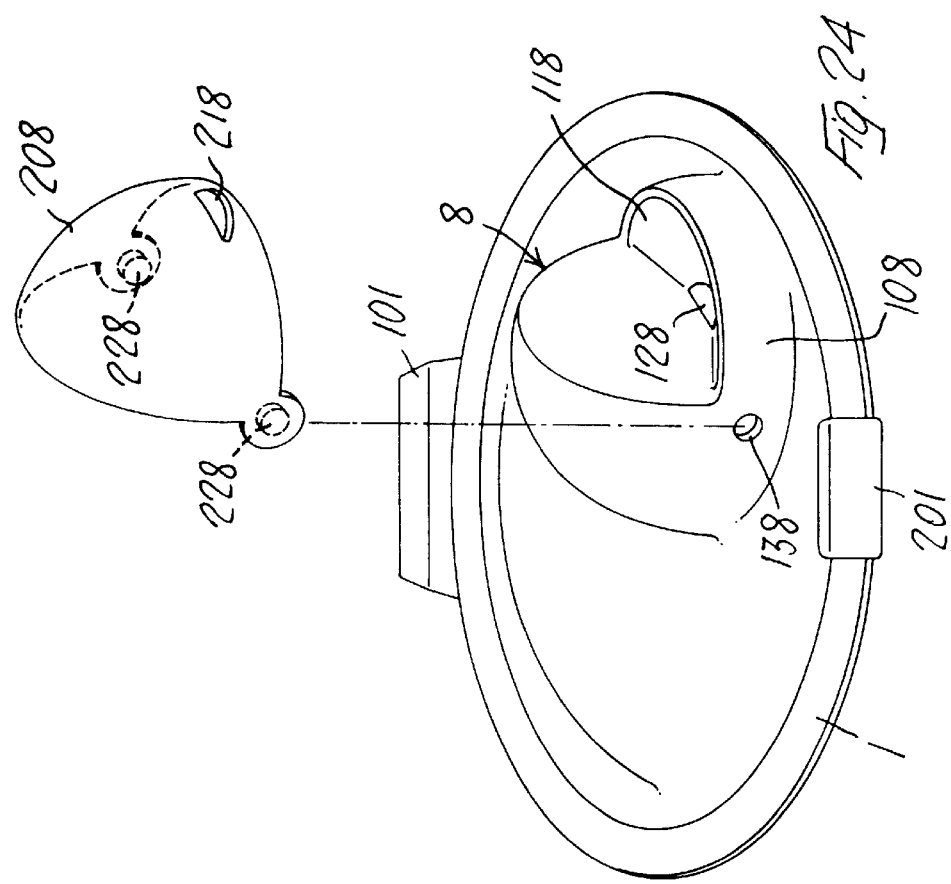

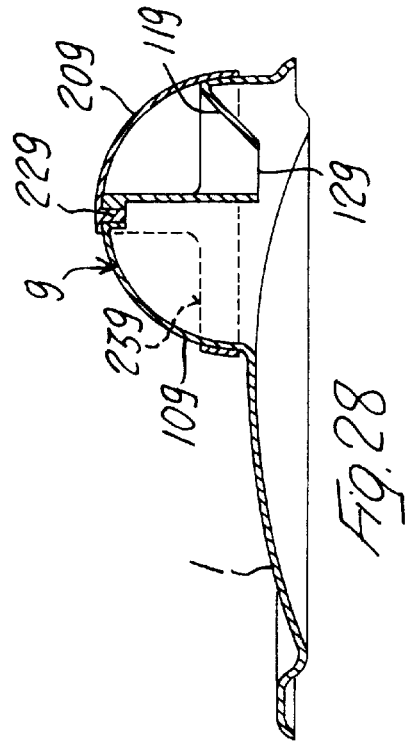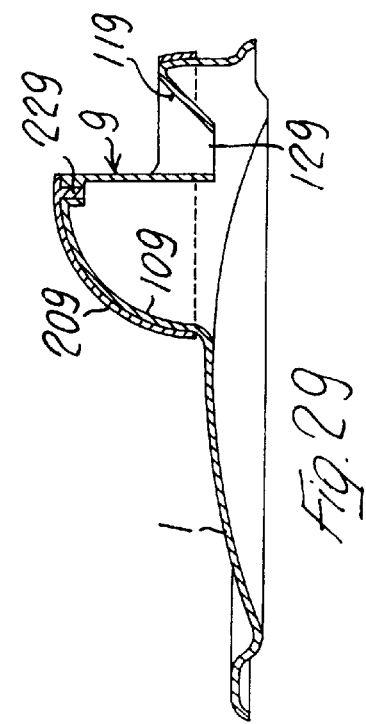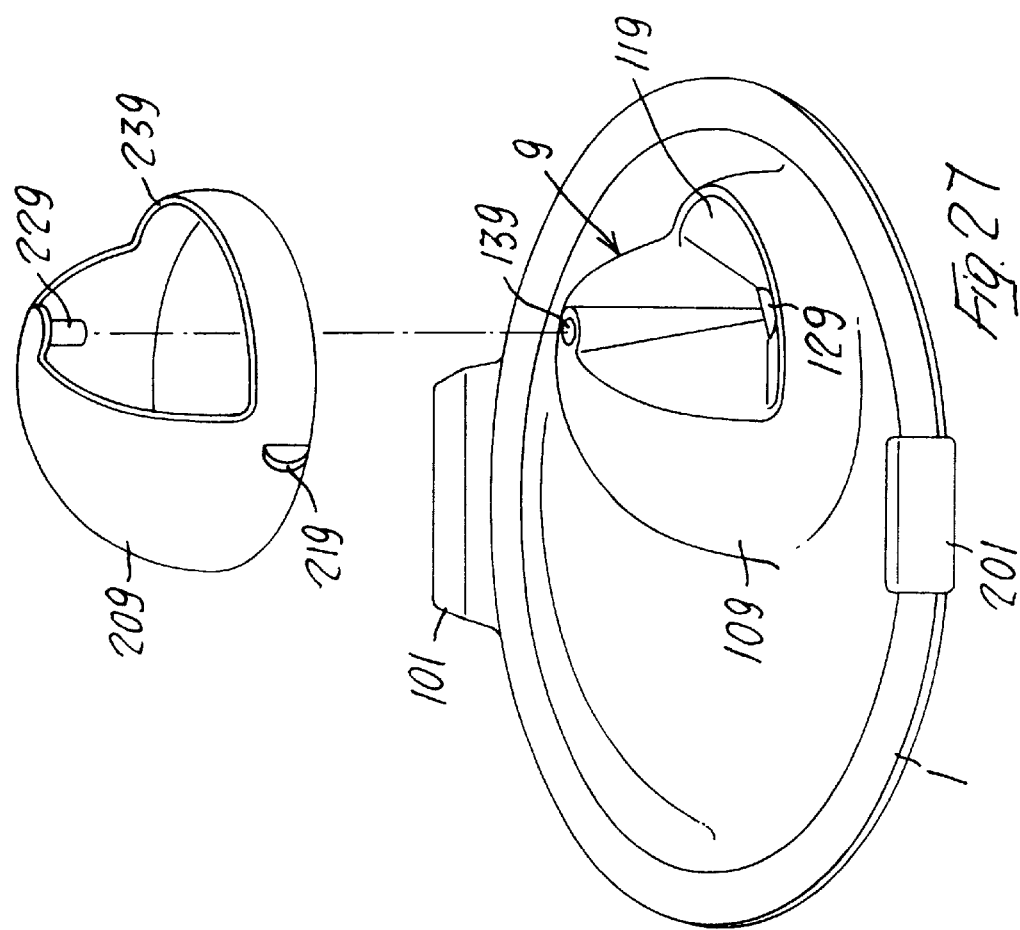

FEED DEVICE FOR PASTY OR LIQUID FOOD MIXTURES

BACKGROUND OF THE INVENTION

The present invention relates to a feed device, in particular for use in machines for processing pasty or liquid food mixtures, such as in machines for pasteurizing ice-cream mixtures, confectioner's custard mixtures, or the like.

It is common practice, in numerous working and processing methods, and in particular when processing ice-cream mixtures and similar food preparations, to add certain ingredients after an initial mixing of the material commonly referred to as the "base". These ingredients may be liquid, solid or semisolid. This operation is usually carried out by opening the lid of the processing chamber. However, for obvious reasons of operator safety, opening the lid of the chamber necessitates switching off both the mixing means and the thermal conditioning system inside the said chamber. Stoppages such as these adversely affect the homogeneity of the mixture and could result in a deterioration of its principal organoleptic properties, taking into account that the mixture cooling process also is interrupted during such stoppages. Another disadvantage that may arise as a result of these interruptions is that the hygienic conditions of the processing environment could also be jeopardized, given that a large part of the mass of product being processed could, during stoppages of this sort, come into contact with the outside environment.

SUMMARY OF THE INVENTION

The object of the invention is therefore to provide a feed device that allows ingredients to be fed into the processing chamber while causing as little disruption as possible to the conditions created inside the said chamber and without having to switch off the thermal conditioning system and/or the mixing means, in a way which is extremely practical in terms of operator convenience.

The subject of the invention is therefore a feed device, preferably for use in machines for processing ice-cream mixtures or the like, comprising an element that swings about a given axis between two positions and works in conjunction with a suitable housing located at an opening made in one wall of the machine which places the processing chamber in communication with the outside environment, one of the two positions of the said swing element allowing communication between the processing chamber and the outside environment and the other preventing such communication.

In particular, said housing may be made of one piece with said wall, or be stably connected thereto; in addition, the wall on which the opening is formed may be the lid itself of the processing chamber.

BRIEF DESCRIPTION OF THE DRAWINGS

Further advantages and features of the present invention will become evident from the following detailed description of some embodiments of the latter, which description is given by way of non-limiting examples and with reference to the attached drawings, in which:

FIGS. 4 and 5 are two longitudinal section views of the device illustrated in FIG. 3, closed and open, respectively;

FIG. 24 illustrates another embodiment of the device according to the invention;

FIGS. 25 and 26 are two longitudinal section views of the device illustrated in FIG. 23, closed and open, respectively;

FIG. 27 illustrates another embodiment of the device according to the invention; and FIGS. 28 and 29 are two longitudinal section views of the device illustrated in FIG. 27, closed and open, respectively.

DESCRIPTION OF THE PREFERRED EMBODIMENTS

Figure 1:
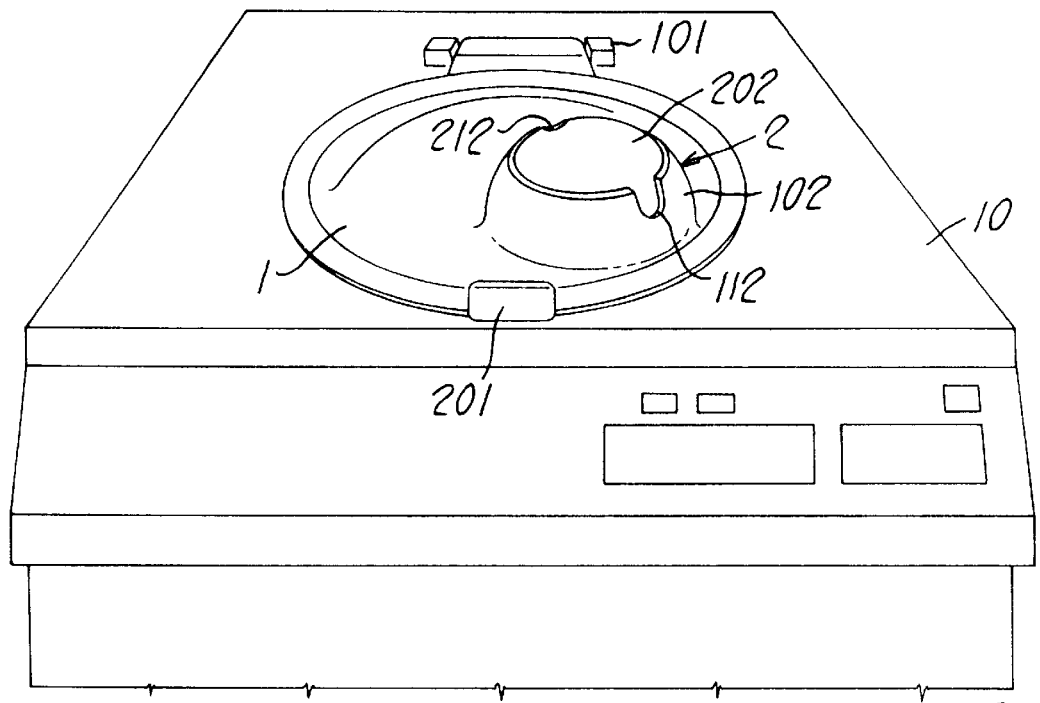
FIG. 1 is a perspective view of a machine for processing ice-cream mixtures or the like, presenting a first embodiment of the device according to the present invention.

FIG. 1 illustrates a machine for processing ice-cream mixtures, fitted with the feed device according to the invention; the reference numeral 10 denotes the machine for processing ice-cream mixtures, fitted with a lid 1 which is hinged to the wall of the said machine at 101 and fitted with opening and closing means 201. The said lid contains the feed device 2 according to the invention, comprising the housing 102 and the swing element 202. The housing 102 has a notch 112 and the swing element has the indentation 212.

Figure 2:
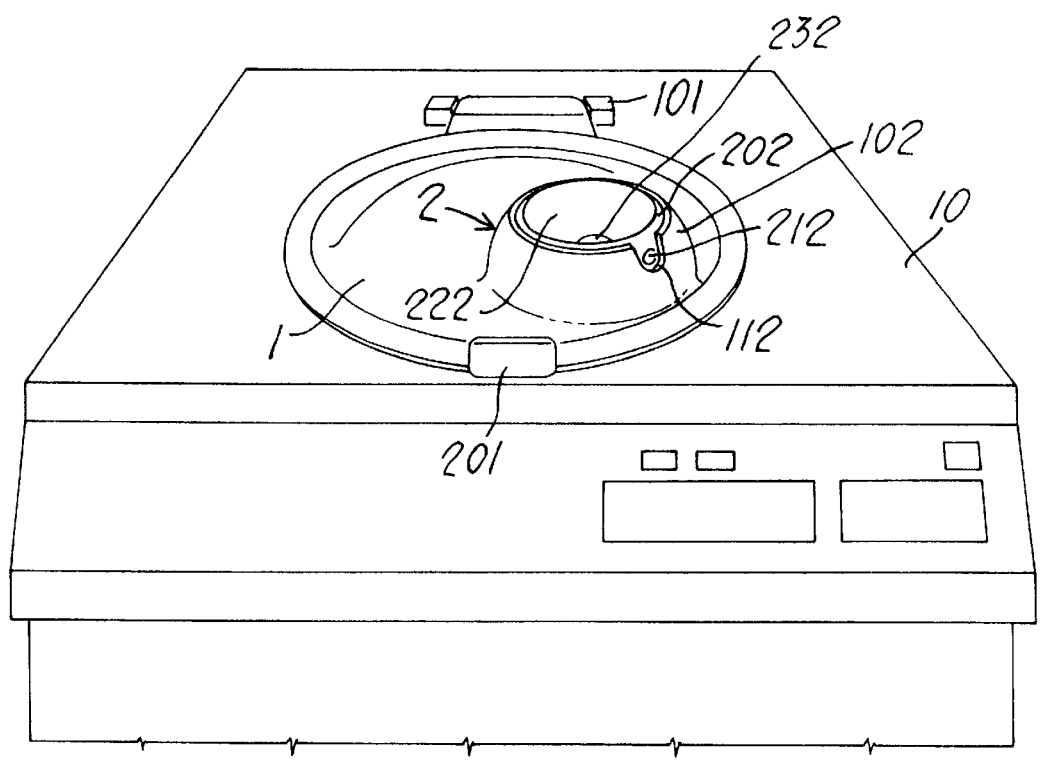
FIG. 2 is similar to FIG. 1 and shows the device of the invention in the closed position.
Figure 3:
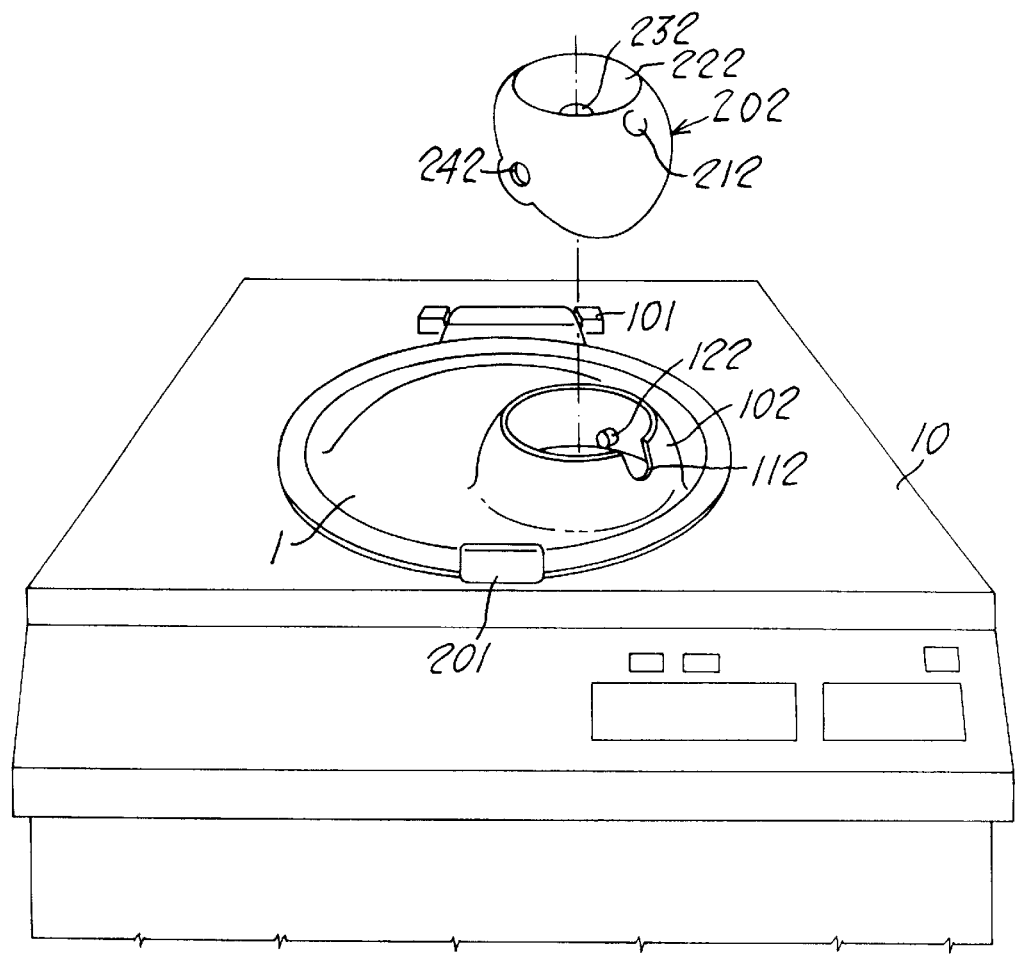
FIG. 3 is a perspective view of the lid of a machine of the type illustrated in FIG. 1, bearing the device according to the invention.

FIG. 2 shows the swing element 202 in a position in which the funnel-shaped cavity 222, which is formed on its surface and has the hole 232 in the bottom, faces outwards. Both the housing 102 and the swing element 202 are more clearly visible in FIG. 3, which shows them in exploded form. The housing 102 is a hollow spherical segment made in one piece with the lid 1 and has a longitudinal notch 112. Two diametrically opposite pins 122, only one of which is illustrated in the figure, are located on the internal surface of the said housing 102 and project radially inwards. The swing element 202 is a semispherical dome with a funnel-shaped conical cavity 222 that has a through hole 232 in the bottom.

The element 202 has slots 242 along its peripheral edge which engage with the pins 122 on the housing 102 in order to attach the element 202 to the latter.

FIGS. 4 and 5 show, in section, the device according to the invention in the closed and open position, respectively. In FIG. 4 the processing chamber 20 containing the mixing means 30 and fitted with a lid 1, is shown isolated from the outside environment, since the swing element 202 of the device 2 is in a position in which the opening in the housing 102 is blocked by the wall of the said element 202. FIG. 5, in contrast, shows the swing element 202 with the funnel-shaped cavity 222 facing the opening in the said housing, thereby placing the processing chamber 20 in communication with the outside environment.

Figure 6:
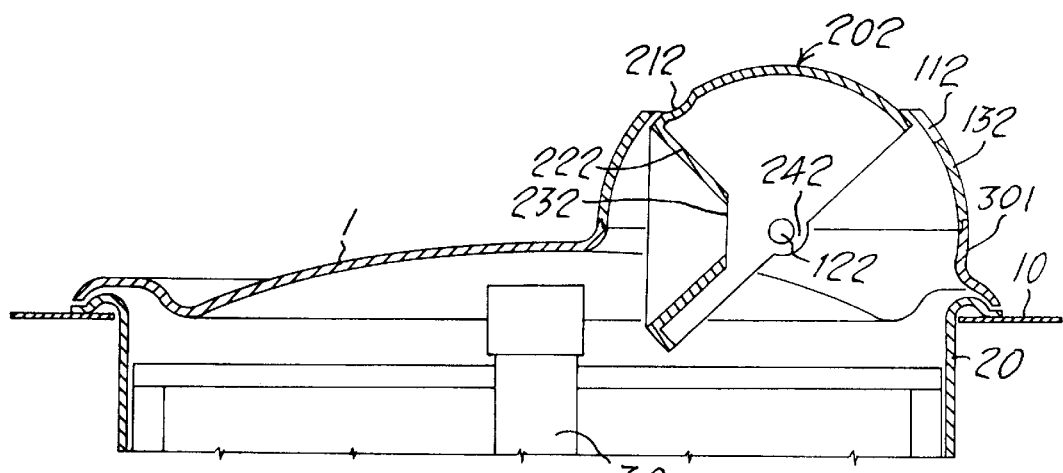
FIG. 6 illustrates a second embodiment of the device according to the invention.

FIG. 6 illustrates a variant embodiment of the invention, in which the housing 132 is not made in one piece with the lid 1 of the machine 10, but is instead welded, glued or fixed to the flange 301 that projects up from the said lid.

Figure 7:
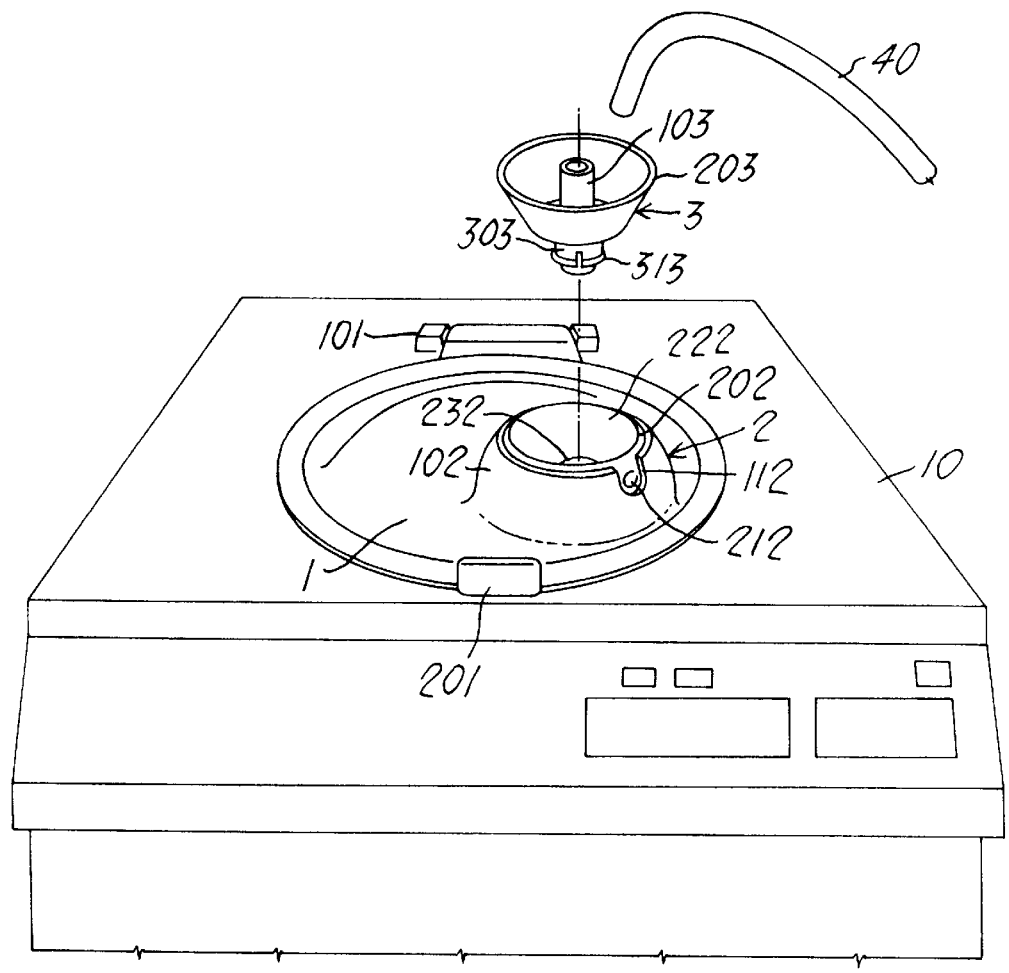
FIGS. 7 and 8 are two longitudinal section views of the device illustrated in FIG. 6, closed and open, respectively.
Figure 8:
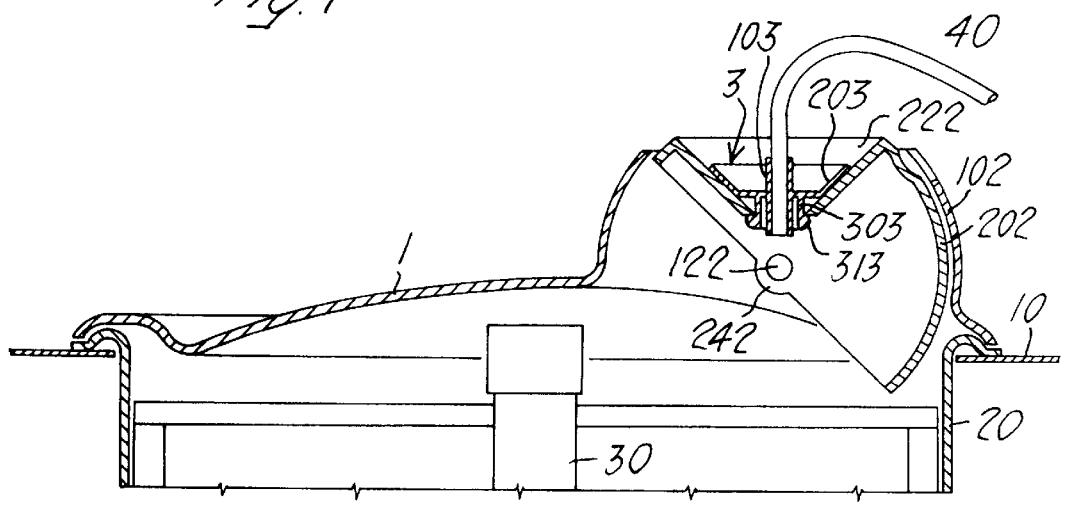

FIGS. 7 and 8 show a further variant embodiment of the device according to the invention; in order to connect a tube 40 securely to the loading device 2, a connecting piece 3 is inserted into the conical cavity 222 of the swing element 202. This connecting piece comprises a pipe 103 inserted in or made in one piece with a conical cup-shaped element 203, and has the bush 303 at one end, the peripheral edge at the free end of the bush having radially projecting, tooth-like ribs 313.

Figure 9:
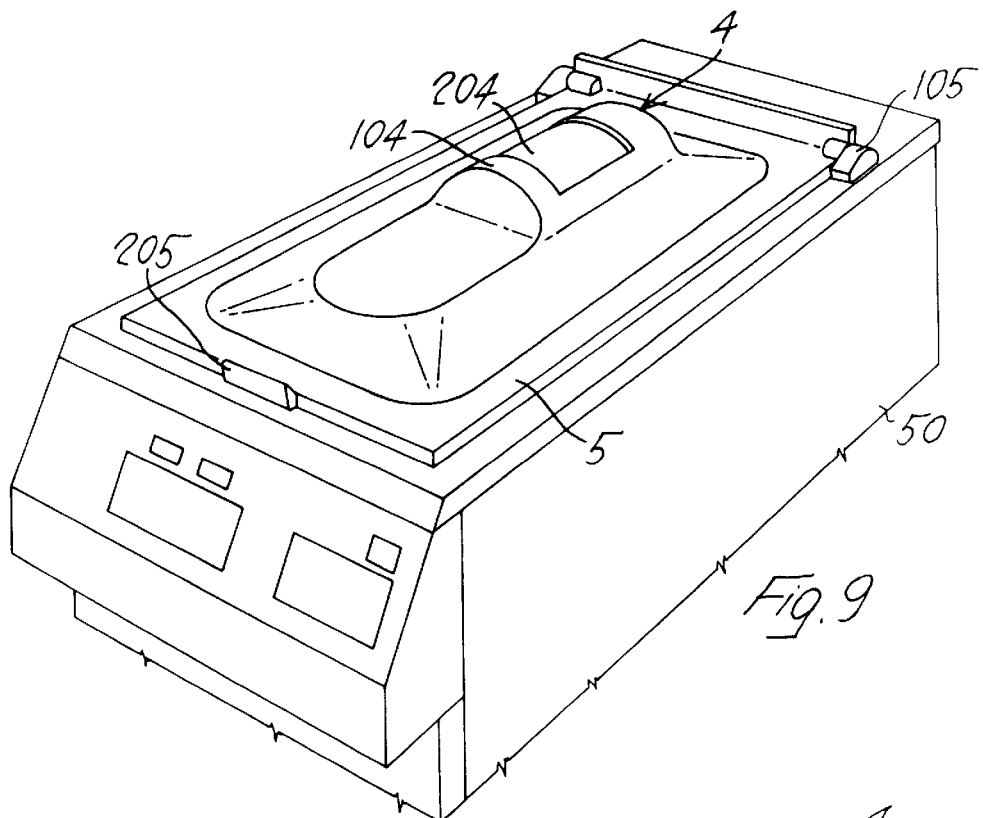
FIG. 9 illustrates a third embodiment of the device according to the invention.
Figure 10:
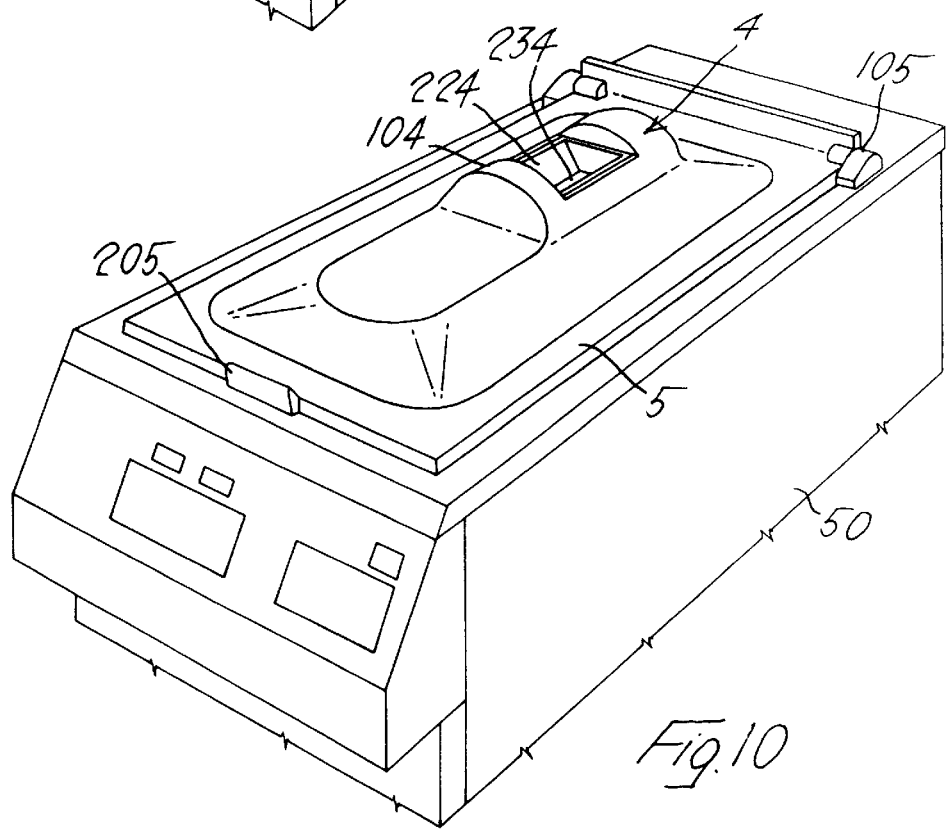
FIGS. 10 and 11 are two longitudinal section views of the device illustrated in FIG. 9, closed and open, respectively.

FIGS. 9 and 10 illustrate a second embodiment of the device according to the invention. The machine 50 has the lid 5, fitted with opening and closing means 205 and hinged at 105. The feed device 4 according to the invention is located on this lid. This device 4 comprises a semicylindrical housing 104 made in one piece with the said lid 5 and a swing element 204. FIG. 10 shows this swing element 204 having a frustopyramidal cavity 224 with an opening 234 in the bottom.

Figure 11:
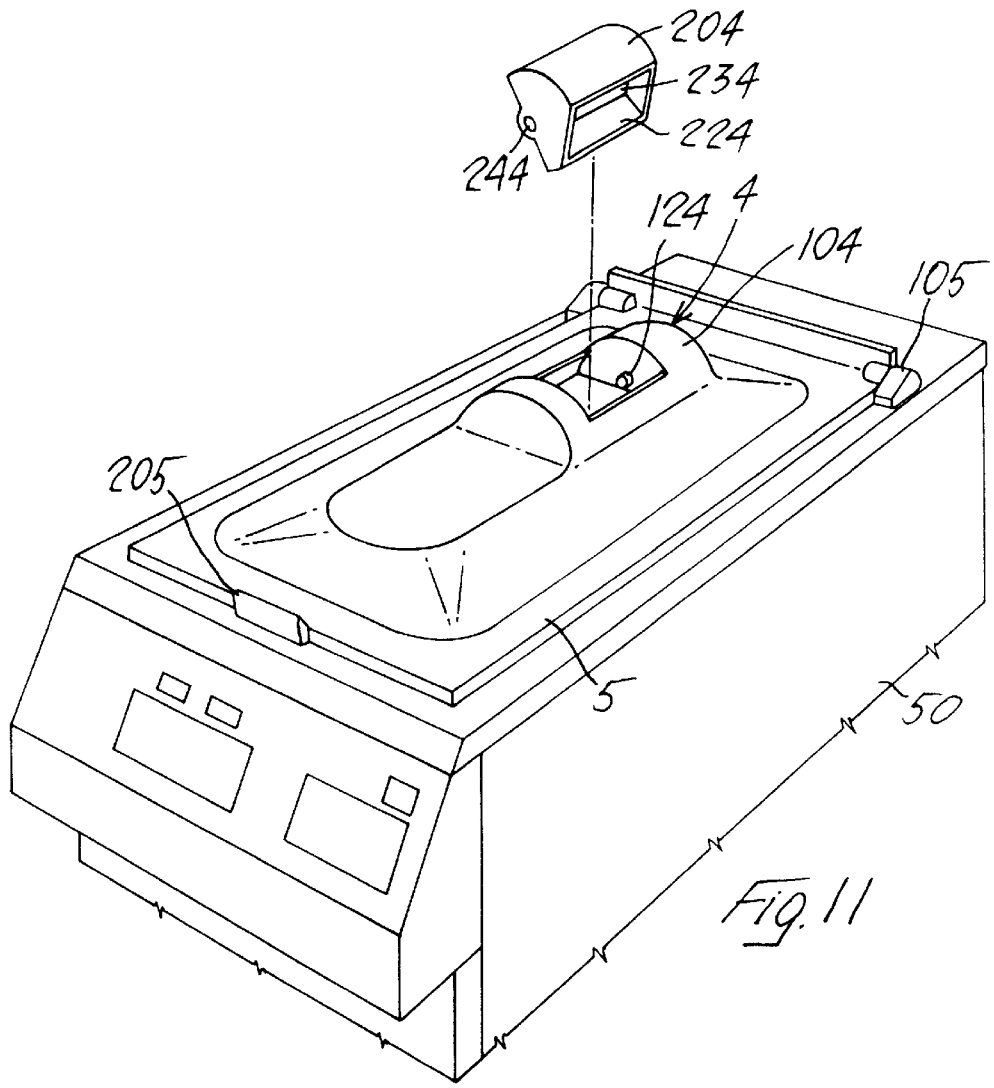
Figure 12:
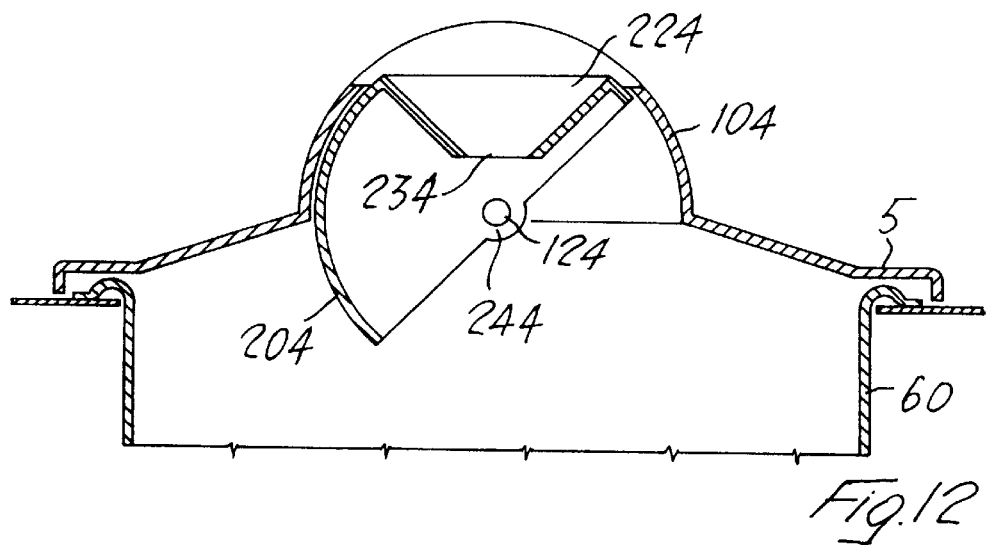
FIG. 12 illustrates a fourth embodiment of the device according to the invention.

FIG. 11 shows the swing element 204 separate from the housing 104, thus making it possible to see the slots 244 designed to engage with the pins 124 that project from the internal surface of the walls of the housing 104. Finally, FIG. 12 illustrates the feed device 4 in section, with the lid 5 and the wall of the processing chamber 60; the same reference numerals have been used to denote similar parts.

The way in which the feed device according to the invention works will become apparent from the following description. As has already been mentioned previously, in machines of the prior art for processing ice-cream mixtures, the machine had to be switched off whenever ingredients needed to be added once the processing had already begun. This was due to the fact that, when partially or fully opening the lid of the processing chamber, certain safety measures had to be respected. By using the device according to the invention these precautions are no longer necessary; this is because the way the swing element 202 is made makes it impossible for the operator to place his hands inside the processing chamber 20, even inadvertently. In an extremely practical way, the frustoconical cavity 222 allows the operator, and actually makes it easier for him, to add liquid, semisolid or solid materials, whether in powder or granular form, into the processing chamber by acting as a funnel to convey the said material. Once the ingredients have been added, the swing element 202 is rotated with respect to the axis that passes through the pins 122, to which it is attached via the slots 242, and the opening in the housing 102 is thus once again closed.

The indentation 212 formed on the surface of the said element, close to the cavity 222, is particularly useful in helping to move the swing element 202 from one position to the other. This indentation 212 thus allows the swing element to be easily moved by the operator who simply has to place one of his fingers inside it. The notch 112 formed in the housing 102, on the other hand, enables the indentation 212 to be used even when the swing element is in the position illustrated in FIGS. 3 and 5.

The variant embodiment shown in FIG. 6 concerns the methods of construction of the device according to the invention. In the event that the lid is not made in such a way as to have the housing 102 as illustrated in FIGS. 1 to 5 and as described above, the housing 132 can be suitably attached to a flange 301 that projects axially from the said lid 1, thereby enabling the device 2 according to the invention to be fitted to the said lid all the same.

If very large quantities of liquid need to be added to the processing chamber 20, the feed device 2 can be fitted with the connecting piece 3, according to the variant embodiment illustrated in FIGS. 7 and 8. Using this connecting piece 3 it is possible securely to connect a tube 40 to the said device 2 by inserting the connecting piece bush 303, which is fitted with the radially projecting tooth-like ribs 313, into the hole 232 in the cavity 222 of the swing element 202.

The embodiment illustrated in FIGS. 9 to 12 is best suited to lids such as the lid 5 illustrated in these figures, that is rectangular lids. The device 4 illustrated in these figures works in exactly the same way as the device 2 illustrated previously. In this case also, it is possible for the housing 104 not to be made, as illustrated in the abovementioned figures, in one piece with the lid 5, but for it to be attached to the lid in a way similar to that described previously with respect to the variant embodiment shown in FIG. 6.

Figure 14:
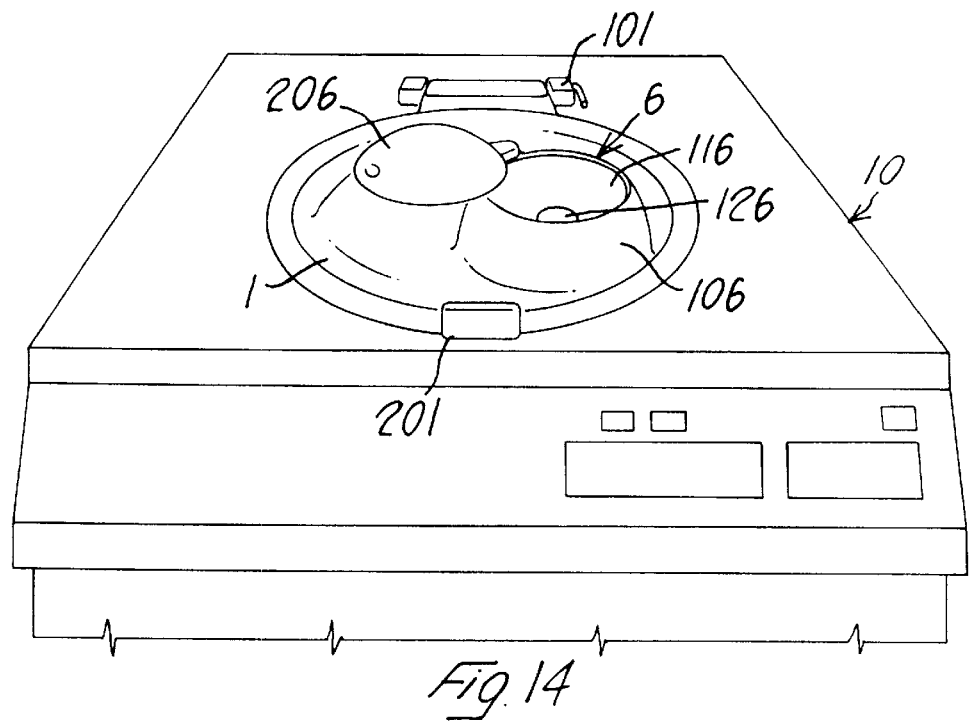
FIG. 14 is similar to FIG. 1 and shows the device of the invention in the closed position.
Figure 13:
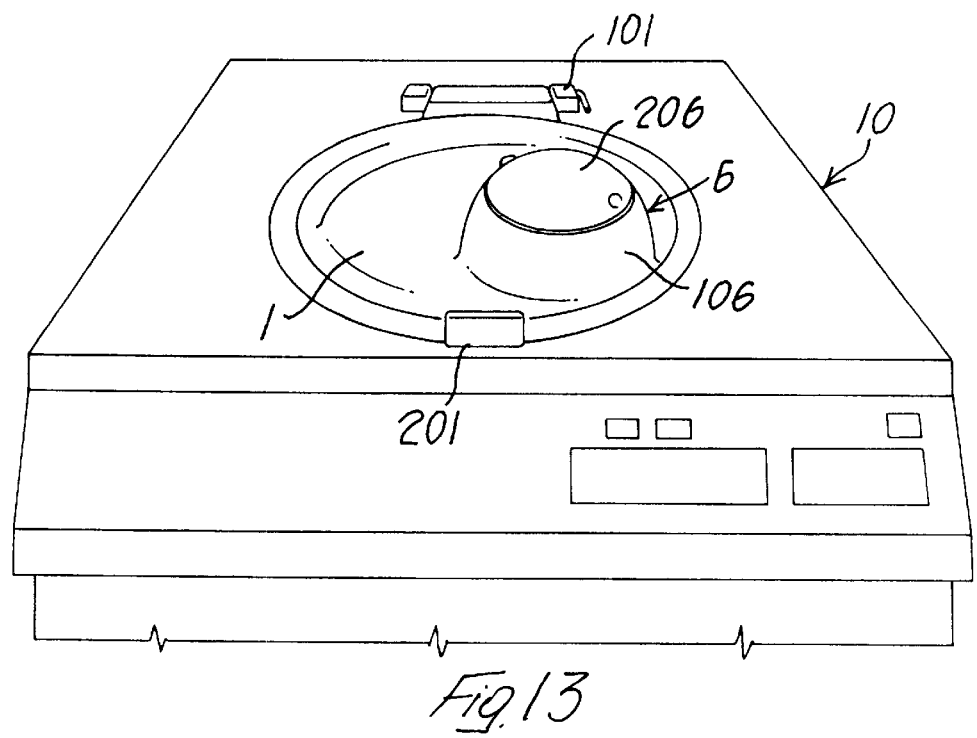
FIG. 13 is a perspective view of a machine for processing ice-cream mixtures or the like, presenting a further embodiment of the device according to the present invention.

FIG. 13 illustrates a machine 10 for processing ice-cream mixtures or the like, fitted with the feed device according to a further embodiment of the invention. The lid 1 of the processing chamber is equipped with means for opening and closing 201 and is hinged in 101 to the wall of the machine. On the lid 1 is set the feed device 6 comprising the swing element 206 which works in conjunction with the housing 106, made of a single piece with said lid 1. FIG. 14 shows the feed device 6 open. The housing presents on its surface the funnel-shaped cavity 116 provided with an opening 126 in the bottom which communicates with the inside of the processing chamber of the machine 10.

Figure 15:
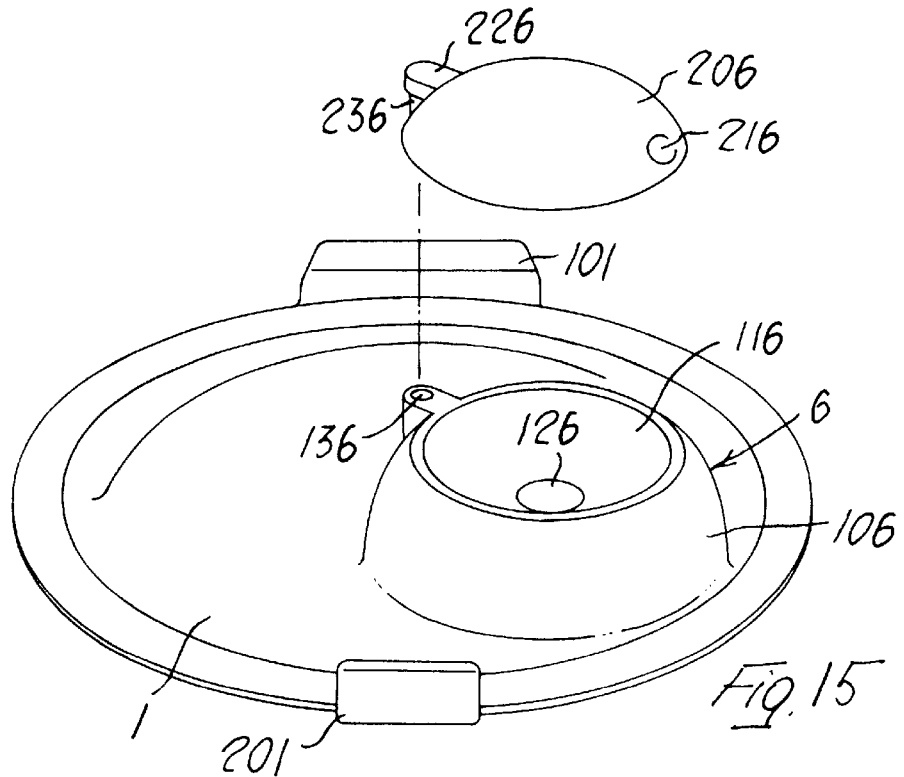
FIG. 15 is a perspective view of the lid of a machine of the type illustrated in FIG. 1, bearing the device according to the invention.
Figure 16:
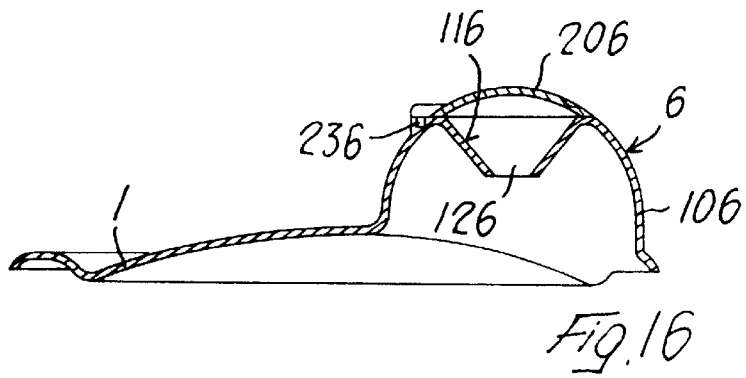
FIGS. 16 and 17 are two longitudinal section views of the device illustrated in FIG. 3, closed and open, respectively.
Figure 17:
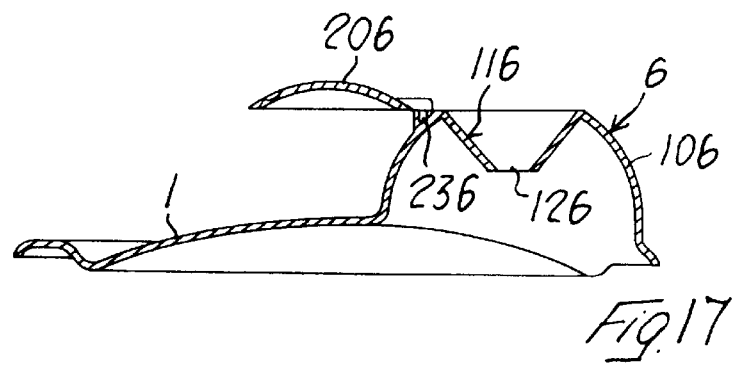

FIG. 15 shows the lid 1 of the machine 10, equipped with the feed device 6. The element 206 works in conjunction with the housing 106 by means of the pin 236 which protrudes axially out of the radial lip 226 of said element 206 and which is inserted in the hole 136 made peripherally to the said housing 106. The element 206 moreover presents on its outer surface the hollow 216 which enables it to be displaced by the operator. FIGS. 16 and 17 present a sectional view of the device 6 in the closed condition (FIG. 16) and open condition (FIG. 17).

Figure 18:
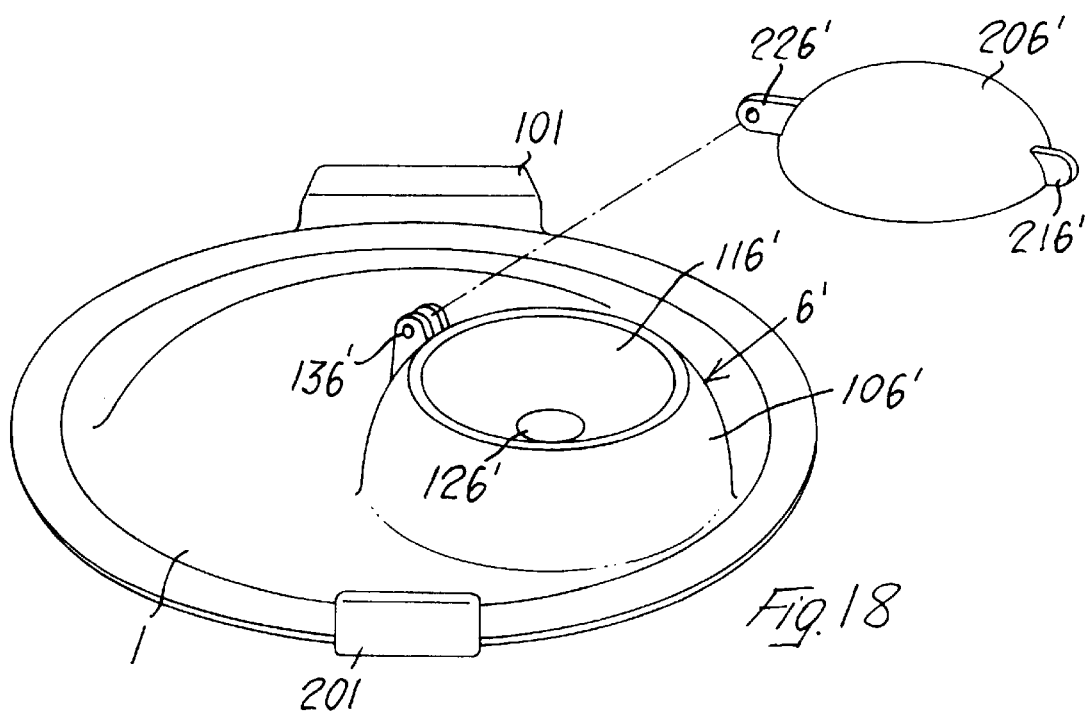
FIG. 18 illustrates still another embodiment of the device according to the invention.
Figure 19:
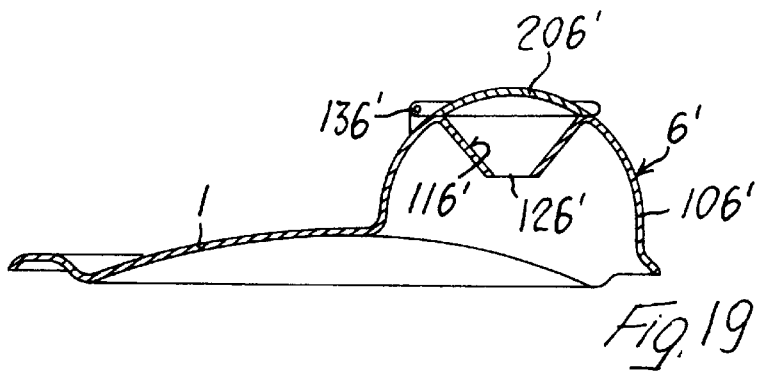
FIGS. 19 and 20 are two longitudinal section views of the device illustrated in FIG. 18, closed and open, respectively.
Figure 20:
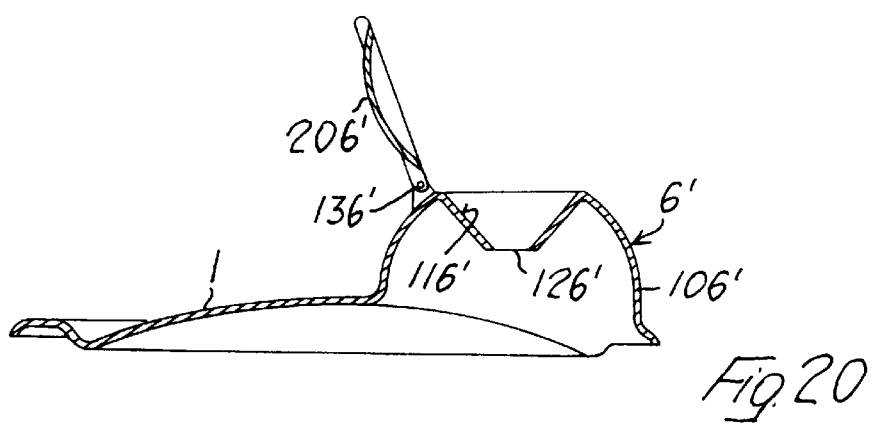

FIG. 18 illustrates another embodiment of the present invention. The lid 1 of the machine is equipped with the feed device 6', which comprises the housing 106' having the shape of a spherical segment and equipped with a funnel-shaped cavity 116' in which there is formed the opening 126'. Near the periphery of the said funnel-shaped cavity 116' of the housing 106' are formed the lugs 136', to which is hinged, by means of its lip 226' which protrudes radially, the element 206', having the shape of a spherical cap, provided moreover with the lip 216' for gripping. In a way similar to what was described previously, in FIGS. 19 and 20 the feed device 6' is illustrated in the closed and open conditions, respectively.

Figure 21:
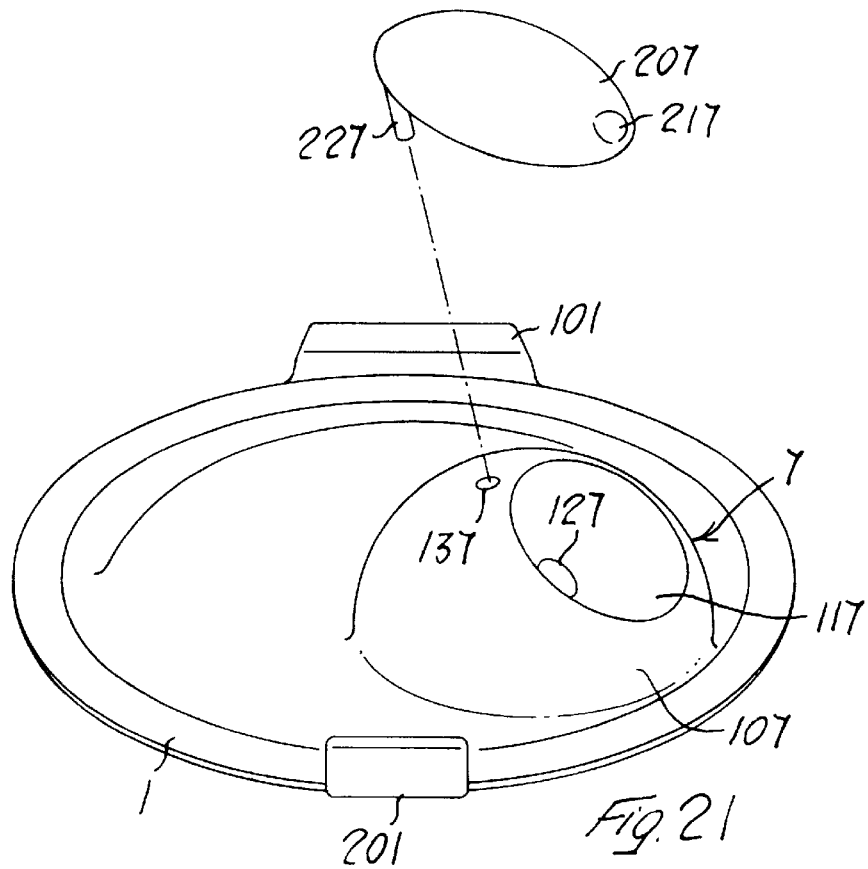
FIG. 21 illustrates a modified embodiment of the device according to the invention.
Figure 22:
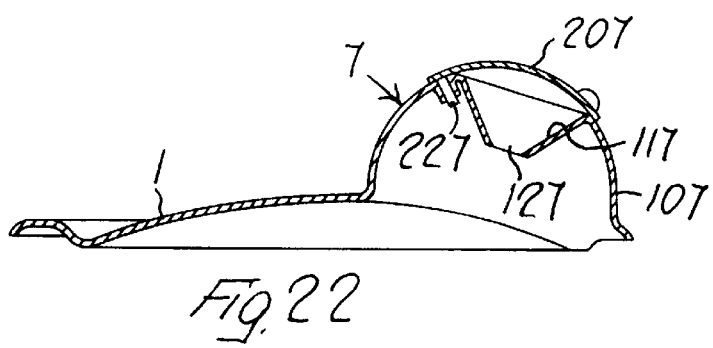
FIGS. 22 and 23 are two longitudinal section views of the device illustrated in FIG. 20, closed and open, respectively.

FIG. 21 illustrates still another embodiment of the present invention. In this case, the lid 1 is equipped with the feed device 7, comprising the housing 107, having the shape of an asymmetrical spherical segment, equipped with a funnel-shaped cavity 117 with axis not perpendicular to the plane of the lid 1, provided with an opening 127 in the bottom, and the element 207, having the shape of a spherical cap, provided with an eccentric pin 227, which works in conjunction with the hole 137 on the surface of the housing 107. Also in FIGS. 22 and 23 the feed device 7, as for the embodiments illustrated previously, is shown in the open and closed conditions, respectively.

FIG. 24 illustrates a modified embodiment of the device according to the invention. The lid 1 is equipped with the feed device 8 comprising a housing 108 having the shape of a hemispherical cap with one sector missing and equipped at the missing sector with a funnel-shaped cavity 118 with axis perpendicular to the lid 1 and having a semicircular section, provided with an opening 128 in the bottom. In addition, the feed device 8 includes the element 208 having the shape of a spherical sector and provided at the two vertices with two pins 228 which protrude radially inwards and which couple to the holes 138 made on the housing 108 and set with their axes parallel to the lid 1. The element 208 is moreover provided with the gripping lip 218. In FIGS. 25 and 26 the feed device 8 is shown in the open and closed conditions, respectively.

Finally, FIG. 27 illustrates another embodiment of the feed device according to the invention. The feed device 9 located on the lid 1 comprises the housing 109 having the shape of a hemispherical cap deprived of one spherical sector. Where the spherical sector is missing, a funnel-shaped cavity 119 is formed having a semicircular section, with axis perpendicular to said lid 1 and provided with an opening 129 in the bottom. The said housing 109 works in conjunction with the element 209, which also has the shape of a hemispherical cap, provided with a window 239 having the shape of a spherical sector. The element 209 is moreover provided with the pin 229 which protrudes radially inwards and which is shaped to fit in the hole 139 located on an axis perpendicular to the lid, radially with respect to the said housing 109.

In FIGS. 28 and 29 the feed device is showed in the open and closed conditions.

The way in which the feed device according to the embodiments of FIGS. 13 to 29 of the invention operates will become apparent from the following description. As illustrated in FIG. 14 of the attached drawings, the housing 106 of the device 6 includes the funnel-shaped cavity 116 forming a single piece with the housing and provided with an opening 126 in the bottom. This conformation of the housing on the one hand facilitates the pouring into the processing chamber of components to be added to the mixture for ice-cream or similar products to be processed, and, on the other, maintains the hygienic quality of the product, in that it prevents the parts that may be exposed to the outside environment from coming into contact with the chamber. The element 206 is displaced into the position illustrated in FIG. 14 during the loading phase, and will then be returned to the closed position, as shown in FIG. 13. Altogether similar characteristics are envisaged for the embodiment illustrated in FIGS. 18 to 20, where the element 206' of the feed device 6' is hinged to the housing 106'.

Figure 23:
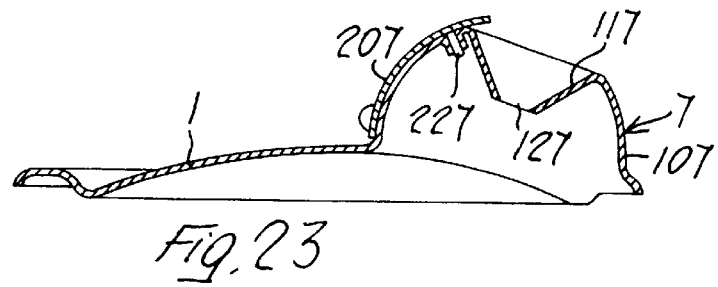

The embodiment shown in FIGS. from 21 to 23 moreover presents the advantage that the element 207 in the loading phase, and hence with the device 7 open, does not protrude externally with respect to the housing 107, as is clearly shown in FIG. 23, and hence does not risk being knocked against, and thus exposed to damage in any way.

A similar solution is obtained with the embodiment illustrated in FIGS. from 24 to 26, where the element 208 of the feed device 8 is connected to the housing in a more stable manner.

Finally the feed device 9 presents an element 209 in which the stability of connection to the housing 109 has also been combined with ease of removal, which makes it possible to attend in a very simple way to the cleaning operations on the said feed device.

We claim:

1. A machine for processing edible mixtures comprising:
   a cabinet including a processing chamber, a wall, and an opening in said wall which places said processing chamber in communication with an outside environment;
   a housing located over said opening;
   a closure element inserted in said housing, said closure element including an opening therein; and
   a mounting means for mounting said closure element for swinging movement in said housing between (a) a first position allowing communication between the outside environment and said processing chamber and (b) a second position preventing communication between the outside environment and said processing chamber.

2. A machine as claimed in claim 1, wherein said housing is made in one piece with said wall.

3. A machine as claimed in claim 1, and further including a connection means for connecting said housing to said wall.

4. A machine as claimed in claim 1, wherein said mounting means mounts said closure element to swing on an axis parallel with said wall.

5. A machine as claimed in claim 1, wherein said closure element has a surface which includes a funnel-shaped cavity and the opening is at a bottom of the cavity.

6. A machine as claimed in claim 1, wherein said mounting means includes a hinge which mounts said closure element to said housing.

7. A machine as claimed in claim 1, wherein said closure element is a semi-spherical dome with a frustoconical cavity, and wherein said housing is a hollow spherical segment having a diameter complementary to a diameter of the semi-spherical dome.

8. A machine as claimed in claim 1, wherein said closure element is a semi-cylindrical element with a frusto-pyramidal cavity in a side wall thereof, wherein said housing is a hollow semi-cylindrical element having a cross-section complementary to a cross-section of said closure element, and wherein said mounting means mounts said closure element in an opening formed in a side surface of said housing.

9. A machine as claimed in claim 5, additionally comprising a connecting element comprising a tubular pipe and a connecting means for removably connecting said pipe to the opening in the bottom of said funnel-shaped cavity in the closure element.

10. A machine as claimed in claim 1, wherein said wall of said cabinet having the opening over which the housing for said closure element is located forms a lid of the processing chamber of said cabinet.

11. A machine as claimed in claim 5, wherein said closure element includes an indentation on an external surface of said closure element close to said funnel-shaped cavity, and wherein said housing has a notch which is aligned with said indentation when said closure element is in one of the first or second positions.

12. A machine for processing edible mixtures comprising:

a cabinet including a processing chamber, a wall, and an opening in said wall which places said processing chamber in communication with an outside environment;

a housing located over said opening, said housing having a funnel-shaped cavity open at a bottom end thereof;

a closure element inserted in said housing, said closure element including a gripping means for facilitating gripping of said closure element; and a mounting means for mounting said closure element for swinging movement in said housing between (a) a first position allowing communication between the outside environment and said processing chamber and (b) a second position preventing communication between the outside environment and said processing chamber.

13. A machine for processing edible mixtures comprising:

a cabinet including a processing chamber, a wall, and an opening in said wall which places said processing chamber in communication with an outside environment;

a housing located over said opening, said housing having a funnel-shaped cavity open at a bottom end thereof;

a closure element inserted in said housing; and a mounting means for mounting said closure element for swinging movement in said housing between (a) a first position allowing communication between the outside environment and said processing chamber and (b) a second position preventing communication between the outside environment and said processing chamber, said mounting means mounting said closure element to swing on an axis parallel to said wall.

14. A machine for processing edible mixtures comprising:

a cabinet including a processing chamber, a wall, and an opening in said wall which places said processing chamber in communication with an outside environment;

a housing located over said opening, said housing having a funnel-shaped cavity open at a bottom end thereof;

a closure element inserted in said housing; and a mounting means for mounting said closure element for swinging movement in said housing between (a) a first position allowing communication between the outside environment and said processing chamber and (b) a second position preventing communication between the outside environment and said processing chamber, said mounting means mounting said closure element to swing on an axis inclined with respect to said wall.

15. A machine for processing edible mixtures comprising:

a cabinet including a processing chamber, a wall, and an opening in said wall which places said processing chamber in communication with an outside environment;

a housing located over said opening, said housing having a funnel-shaped cavity open at a bottom end thereof;

a closure element inserted in said housing; and a mounting means for mounting said closure element for swinging movement in said housing between (a) a first position allowing communication between the outside environment and said processing chamber and (b) a second position preventing communication between the outside environment and said processing chamber, said mounting means mounting said closure element to swing on an axis perpendicular to said wall.

16. A machine for processing edible mixtures comprising:

a cabinet including a processing chamber, a wall, and an opening in said wall which places said processing chamber in communication with an outside environment;

a housing located over said opening, said housing having a funnel-shaped cavity open at a bottom end thereof;

a closure element inserted in said housing;

a mounting means for mounting said closure element for swinging movement in said housing between (a) a first position allowing communication between the outside environment and said processing chamber and (b) a second position preventing communication between the outside environment and said processing chamber; and said closure element being irremovably mounted by said mounting means to said housing.

17. A machine for processing edible mixtures comprising:

a cabinet including a processing chamber, a wall, and an opening in said wall which places said processing chamber in communication with an outside environment;

a housing being a spherical segment made as one piece with said wall and located over said opening, said housing having a funnel-shaped cavity open at a bottom end thereof;

a closure element inserted in said housing, said closure element being a spherical cap complementary to the spherical segment of said housing; and a mounting means for mounting said closure element for swinging movement in said housing between (a) a first position allowing communication between the outside environment and said processing chamber and (b) a second position preventing communication between the outside environment and said processing chamber.

18. A machine for processing edible mixtures comprising:

a cabinet including a processing chamber, a wall, and an opening in said wall which places said processing chamber in communication with an outside environment;

a housing located over said opening, said housing being a spherical segment with a missing sector and being made in one piece with said wall and having a funnel-shaped cavity open at a bottom end thereof;

a closure element inserted in said housing; and a mounting means for mounting said closure element for swinging movement in said housing between (a) a first position allowing communication between the outside environment and said processing chamber and (b) a second position preventing communication between the outside environment and said processing chamber.

* * * * *